US008427461B2

(12) United States Patent
Lin

(10) Patent No.: US 8,427,461 B2
(45) Date of Patent: Apr. 23, 2013

(54) DISPLAY SYSTEM AND SOURCE DRIVING APPARATUS

(75) Inventor: Jr-Ching Lin, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 784 days.

(21) Appl. No.: 12/485,916

(22) Filed: Jun. 17, 2009

(65) Prior Publication Data

US 2010/0164913 A1 Jul. 1, 2010

(30) Foreign Application Priority Data

Dec. 30, 2008 (TW) ............................... 97151431 A

(51) Int. Cl.

| | |
|---|---|
| ***G06F 3/038*** | (2006.01) |
| ***G09G 5/00*** | (2006.01) |
| ***G09G 3/18*** | (2006.01) |
| ***G09G 3/20*** | (2006.01) |
| ***G09G 3/36*** | (2006.01) |

(52) U.S. Cl.

USPC ................. 345/205; 345/51; 345/55; 345/91; 345/100

(58) Field of Classification Search ................... 345/205

See application file for complete search history.

(56) References Cited

U.S. PATENT DOCUMENTS

| | | | | |
|---|---|---|---|---|
| 5,495,287 | A * | 2/1996 | Kasai et al. | 345/89 |
| 7,148,885 | B2 * | 12/2006 | Nose | 345/209 |
| 2002/0080109 | A1 * | 6/2002 | Nagata et al. | 345/92 |
| 2007/0229432 | A1 * | 10/2007 | Kimura | 345/96 |
| 2008/0252586 | A1 * | 10/2008 | Cheng | 345/99 |
| 2010/0225570 | A1 * | 9/2010 | Liu et al. | 345/92 |

FOREIGN PATENT DOCUMENTS

| | | |
|---|---|---|
| TW | 594654 | 6/2004 |
| TW | I265340 | 11/2006 |
| WO | 2007135803 | 11/2007 |

OTHER PUBLICATIONS

"Office Action of Taiwan counterpart application" issued on Jan. 23, 2013, p1-p8, in which the listed references were cited.

* cited by examiner

*Primary Examiner* — Alexander S Beck
*Assistant Examiner* — Mihir Rayan
(74) *Attorney, Agent, or Firm* — Jianq Chyun IP Office

(57) ABSTRACT

A display system, a source driving apparatus, and a method of black insertion are provided. The apparatus includes a data channel, a black-insertion-data line, a first and a second selector. In a first period, the first selector electrically connects the data channel to a first data line in a display panel, and the second selector electrically connects the black-insertion-data line to a second data line in the display panel. In a second period, the first selector electrically connects the data channel to the second data line, and the second selector electrically connects the black-insertion-data line to the first data line.

10 Claims, 12 Drawing Sheets

| | | | | | |
|---|---|---|---|---|---|
| + | − | + | − | + | − |
| − | + | − | + | − | + |
| + | − | + | − | + | − |
| − | + | − | + | − | + |
| + | − | + | − | + | − |
| − | + | − | + | − | + |

FIG. 1A (PRIOR ART)

| | | | | | |
|---|---|---|---|---|---|
| B | B | B | B | B | B |
| B | B | B | B | B | B |
| B | B | B | B | B | B |
| B | B | B | B | B | B |
| B | B | B | B | B | B |
| B | B | B | B | B | B |

FIG. 1B (PRIOR ART)

DISPLAY SYSTEM AND SOURCE DRIVING APPARATUS

CROSS-REFERENCE TO RELATED APPLICATION

This application claims the priority benefit of Taiwan application serial no. 97151431, filed on Dec. 30, 2008. The entirety of the above-mentioned patent application is hereby incorporated by reference herein and made a part of specification.

BACKGROUND OF THE INVENTION

1. Field of the Invention

The present invention relates to a method of black insertion, and more particularly, to a source driving apparatus using column black insertion and the method of black insertion thereof.

2. Description of Related Art

With the progress in human civilization, image devices have become common in people's daily lives and display apparatus are the indispensable components in these image devices. A user reads messages through a display apparatus and even indirectly controls operations of a device through the display apparatus. Flat panel displays (FPD) have such superior characteristics such as efficient space usage, high picture quality, low power consumption, and no radiation that the FPD have gradually replaced conventional cathode ray tube (CRT) displays in recent years. However, the FPD utilizes a hold-type display in which a pixel keeps displaying current data before subsequent data is written into the pixel. Therefore, such hold-type display, when used to display a dynamic image, causes the dynamic image to appear to be dragging due to image retention of the eye.

In order to improve dynamic image quality of a liquid crystal display, a current and common method is to increase frame rate and insert a fully black image or an image whose pixel data has been calculated between two normal display images. In other words, if a 60 Hz image is to be normally displayed, frequency of the display has to be increased to 120 Hz in order to insert a fully black image or a calculated image between two normal display images, as alternately showing FIG. 1A and FIG. 1B. FIG. 1A and FIG. 1B are schematic diagrams illustrating a display image of a conventional black insertion method. Regardless of which type of image is inserted, data bandwidth required by driving chips of the liquid crystal panel will increase, which results in raised difficulty and cost in the design and fabrication of the display system control board, the timing controller (T-CON), and the driving chips (e.g. a source driving chip or a gate driving chip).

In addition, the conventional black insertion method also uses row black insertion to perform black insertion of the display. Row black insertion may be single-row black insertion or area black insertion (i.e. two or more rows). Black insertion data is transmitted to a pixel row of a scan line for black insertion such that pixels in a single row or multiple rows (i.e. area) display black insertion data. In a next display image, normal display pixel rows are black inserted and the originally black inserted pixel rows are normally displayed so as to perform black insertion of the display image.

SUMMARY OF THE INVENTION

The present invention provides a source driving apparatus capable of reducing bandwidth of data transmission.

The present invention further provides a method of black insertion capable of performing black insertion by column black insertion.

The present invention still provides an image display system capable of simultaneously displaying pixel data and black insertion data on a scan line.

The present invention provides a source driving apparatus including a first data channel, a black insertion data line, a first selector, and a second selector. The black insertion data line is for providing black insertion data. A first terminal of the first selector is coupled to a first data line in a display panel, a second terminal of the first selector is coupled to a second data line in the display panel, and a first common terminal of the first selector is coupled to an output terminal of the first data channel. A first terminal of the second selector is coupled to the first data line, a second terminal of the second selector is coupled to the second data line, and a common terminal of the second selector is coupled to the black insertion data line. In a first period, the first selector electrically connects the first common terminal thereof to the first terminal thereof and the second selector electrically connects the common terminal thereof to the second terminal thereof. In a second period, the first selector electrically connects the first common terminal thereof to the second terminal thereof and the second selector electrically connects the common terminal thereof to the first terminal thereof.

In one embodiment of the present invention, the source driving apparatus further includes a second data channel, the first selector further includes a second common terminal and a third terminal, and the second selector further includes a third terminal. The third terminal of the first selector is coupled to a third data line in the display panel and the second common terminal of the first selector is coupled to an output terminal of the second data channel. The third terminal of the second selector electrically connects to the third data line. In the first and second periods, the first selector electrically connects the second common terminal thereof to the third terminal thereof. In a third period, the first selector electrically connects the first common terminal thereof to the second terminal thereof, the first selector electrically connects the second common terminal thereof the first terminal thereof, and the second selector electrically connects the common terminal thereof to the third terminal thereof.

In one embodiment of the present invention, the first period is a $(3i-1)^{th}$ frame period of the display panel, the second period is a $(3i-2)^{th}$ frame period of the display panel, and the third period is a $3i^{th}$ frame period of the display panel, i being a positive integer.

In one embodiment of the present invention, the first period is an odd-numbered frame period of the display panel and the second period is an even-numbered frame period of the display panel.

In one embodiment of the present invention, the first period is a scan period of $(4i-3)^{th}$ and $(4i-2)^{th}$ scan lines in an odd-numbered frame period of the display panel or a scan period of $(4i-1)^{th}$ and $4i^{th}$ scan lines in an even-numbered frame period of the display panel. The second period is a scan period of (4i−1)th and $4i^{th}$ scan lines in the odd-numbered frame period of the display panel or a scan period of $(4i-3)^{th}$ and $(4i-2)^{th}$ scan lines in the even-numbered frame period of the display panel.

In one embodiment of the present invention, the first data channel includes a first latch, a second latch, a digital to analog converter (DAC), and an amplifier. An input terminal of the first latch receives pixel data and a trigger terminal of the first latch is coupled to a control signal. An input terminal of the second latch is coupled to an output terminal of the first latch and a trigger terminal of the second latch is coupled to a horizontal synchronizing signal. An input terminal of the DAC is coupled to an output terminal of the second latch. An input terminal of the amplifier is coupled to an output terminal of the DAC and an output terminal of the amplifier is coupled to the first common terminal of the first selector.

The present invention provides a method of black insertion including the following steps. First, pixel data of a first group of pixels in a scan line is transmitted to a source driving apparatus in a horizontal scan period. Next, the source driving apparatus drives the first group of pixels according to the pixel data of the first group of pixels. Last, the source driving apparatus drives a second group of pixels in the scan line in the horizontal scan period according to black insertion data, wherein the second group of pixels is different from the first group of pixels.

In one embodiment of the present invention, the method of black insertion further includes transmitting pixel data of a third group of pixels in the scan line in the horizontal scan period and the source driving apparatus driving the third group of pixels according to the pixel data of the third group of pixels, wherein the third group of pixels is different from the first and second groups of pixels.

The present invention provides a display system including a source driving circuit of a display panel. The source driving circuit is coupled to the display panel for simultaneously outputting black insertion data and pixel data to the display panel so that the display panel displays the pixel data and the black insertion data at the same time on at least one scan line.

In one embodiment of the present invention, the source driving circuit outputs the pixel data to drive a first group of pixels on the scan line and outputs the black insertion data to drive a second group of pixels on the scan line so that the first group of pixels and the second group of pixels respectively display the pixel data and the black insertion data.

In one embodiment of the present invention, the pixels of the third groups of pixels are not adjacent to each other.

In one embodiment of the present invention, the pixels of the first groups of pixels are not adjacent to each other and the pixels of the second groups of pixels are not adjacent to each other.

In one embodiment of the present invention, the pixels of the first groups of pixels are adjacent to each other and the pixels of the second groups of pixels are adjacent to each other.

Based on the above, in the display system, the source driving apparatus, and the method of black insertion of the present invention, the pixel data required to be displayed in the scan line is transmitted and the rest of the pixels are driven with black insertion data so that the pixel data and the black insertion data are simultaneously displayed on a single scan line. Accordingly, column black insertion is used for performing black insertion to enhance dynamic display of an image and to reduce bandwidth of data transmission.

In order to make the aforementioned and other objects, features and advantages of the present invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 1A and FIG. 1B are schematic diagrams illustrating a display image of a conventional method of black insertion.

DESCRIPTION OF EMBODIMENTS

[First Embodiment]

Figure 2A:
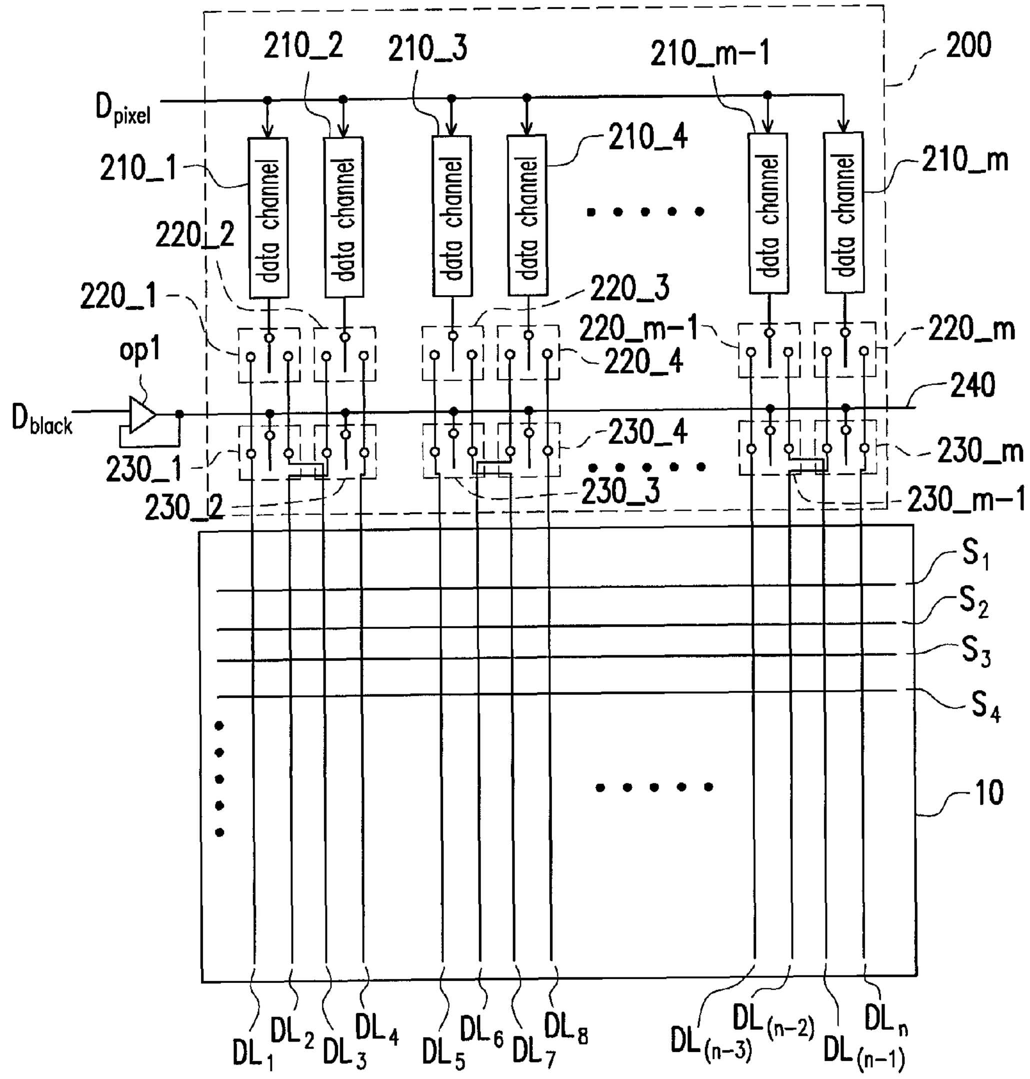
FIG. 2A is a schematic diagram of a source driving apparatus of a first embodiment of the present invention coupled to a display panel.

FIG. 2A is a schematic diagram of a source driving apparatus of the first embodiment of the present invention coupled to a display panel. Referring to FIG. 2A, in the present embodiment, a source driving apparatus 200 is coupled to a display panel 10 having a plurality of scan lines (e.g. $S_1$ and $S_2$) and n data lines (e.g. $DL_1$~$DL_n$). The source driving apparatus 200 includes data channels (i.e. the first data channel) 210_1~210_m, a black insertion line 240, first selectors 220_1~220_m, and second selectors 230_1~230_m. The black insertion data line receives black insertion data $D_{black}$ through an amplifier op1 to provide the black insertion data $D_{black}$ to the corresponding data line, n and m being positive integers and n being presumed to be 2m.

The data channels 210_1~210_m jointly receive pixel data $D_{pixel}$. Take the first selector 220_1 in the first selectors 220_1~220_m as an example for illustration. A first terminal of the first selector 220_1 is coupled to the data line $DL_1$ (i.e. the first data line) in the display panel 10, a second terminal of the first selector 220_1 is coupled to the data line $DL_3$ (i.e. the second data line) in the display panel 10, and a first common terminal of the first selector 220_1 is coupled to an output terminal of the first data channel 210_1. Also take the second selector 230_1 in the second selectors 230_1~220_m as an example for illustration. A first terminal of the second selector 230_1 is coupled to the data line $DL_1$, a second terminal of the second selector 230_1 is coupled to the data line $DL_3$, and a common terminal of the second selector 230_1 is coupled to the black insertion data line 240. The above description may be regarded as a path of data transmission of the data channel 210_1.

In addition, path of data transmission of the data channel 210_2 is illustrated in the following. A first terminal of the first selector 220_2 is coupled to the data line $DL_2$ in the display panel 10, a second terminal of the first selector 220_2 is coupled to the data line $DL_4$ in the display panel 10, and a first common terminal of the first selector 220_2 is coupled to an output terminal of the data channel 210_2. A first terminal of the second selector 230_2 is coupled to the data line $DL_2$, a second terminal of the second selector 230_2 is coupled to the data line $DL_4$, and a common terminal of the second selector 230_2 is coupled to the black insertion data line 240. The path of data transmission of the data channel 210_3 is similar to the path of data transmission of the data channel 210_1, wherein the first terminals and the second terminals of the first and second selectors are respectively coupled to the data lines $DL_5$ and $DL_7$. The path of data transmission of the data channel 210_4 is similar to the path of data transmission of the data channel 210_2, wherein the first terminals and the second terminals of the first and second selectors are respectively coupled to the data lines $DL_6$ and $DL_8$.

According to the above illustration, in the source driving apparatus 200, the paths of data transmission of odd-numbered data channels are similar to the path of data transmission of the data channel 210_1, wherein the first terminals and the second terminals of the first and second selectors are respectively coupled to two approximate odd-numbered data lines. The paths of data transmission of even-numbered data channels are similar to the path of data transmission of the data channel 210_2, wherein the first terminals and the second terminals of the first and second selectors are respectively coupled to two approximate even-numbered data lines. Accordingly, bandwidth of data transmission can be reduced.

Figure 2B:
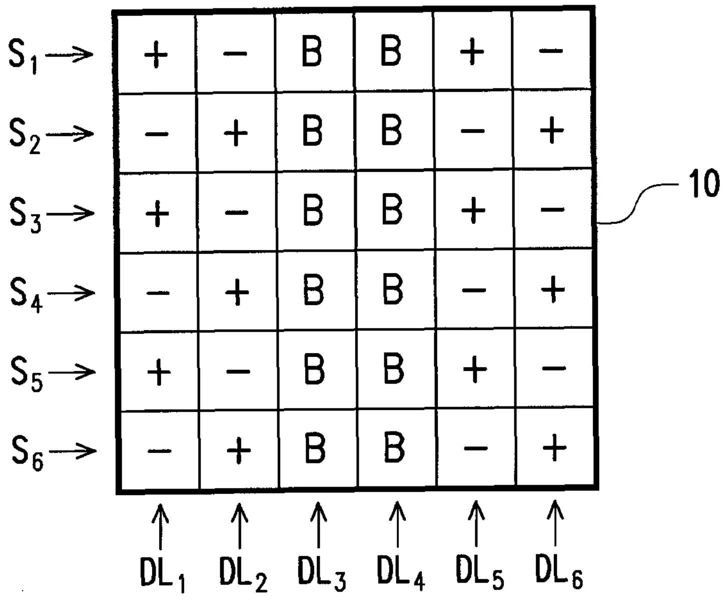
FIGS. 2B, 2C, 2D, and 2E are schematic diagrams showing part of pixels in the display panel of FIG. 2A.

In a first period (herein illustrated with a first frame period as an example), the first selectors 220_1~220_m all electrically connect the first common terminals thereof to the first terminals thereof and the second selectors 230_1~230_m all electrically connect the common terminals thereof to the second terminals thereof. In other words, the data lines $DL_1$, $DL_2$, $DL_5$, $DL_6$ . . . , $DL_{(n-3)}$, and $DL_{(n-2)}$ receive the pixel data which enables the pixels of these data lines to display normal display. The remaining data lines $DL_3$, $DL_4$, $DL_7$, $DL_8$ . . . , $DL_{(n-1)}$, and $DL_n$ receive the black insertion data $D_{black}$ which enables the pixels of these data lines to display black insertion. The black insertion may display specific gray level or black. In other words, the black insertion data $D_{black}$ may be specific gray data or black data, which is not intended to be limited in the present embodiment. Refer to the display in FIG. 2B which shows part of the pixels of the display panel of FIG. 2A. From FIG. 2B, the display panel 10 displays two columns of normal display, then two columns of black insertion, then two columns of normal display again, and so forth. That is, each row of pixels of the display panel 10 simultaneously displays pixel data and black insertion data. The group of pixels displays normal display is a first group of pixels and the group of pixels displays black insertion is a second group of pixels. The symbols "+" and "−" indicate polarity of the pixel data which may be modified by persons of ordinary skill in the art based on design requirement and is not intended to limit the implementation of the present embodiment.

Figure 2C:
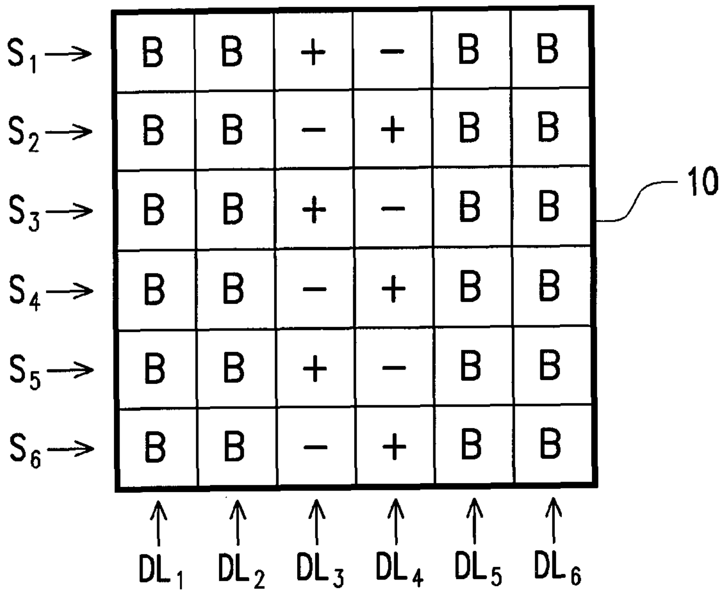

In a second period (herein illustrated with a second frame period as an example), the first selectors 220_1~220_m all electrically connect the first common terminals thereof to the second terminals thereof and the second selectors 230_1~230_m all electrically connect the common terminals thereof to the first terminals thereof. In other words, the data lines $DL_1$, $DL_2$, $DL_5$, $DL_8$ . . . , $DL_{(n-3)}$, and $DL_{(n-2)}$ receive the black insertion data $D_{black}$ which enables the pixels of these data lines to display black insertion. The remaining data lines $DL_3$, $DL_4$, $DL_7$, $DL_8$ . . . , $DL_{(n-1)}$, and $DL_n$ receive the pixel data which enables the pixels of these data lines to display normal display. Refer to the display in FIG. 2C which shows part of the pixels of the display panel of FIG. 2A. From FIG. 2C, the display panel 10 displays two columns of black insertion, then two columns of normal display, then two columns of black insertion, and so forth.

Operations of the source driving apparatus 200 in a third frame period are the same as the operations in the first frame period and operations of the source driving apparatus 200 in a fourth frame period are the same as the operations in the second frame period. Operations of the source driving apparatus 200 in remaining frame periods may be deduced from the above illustration and will not be further described at length herein. Accordingly, black insertion of a display panel may be performed with column black insertion in order to enhance display quality of a dynamic image.

Furthermore, referring to FIG. 2A, if time setting of the first and second periods is changed, the method of black insertion of the display panel 10 will also be changed accordingly. The first period may be a scan period of scan lines $S_1$ and $S_2$ in the first frame period of the display panel 10 and operations of the source driving apparatus 200 are the same as in the above description on the first period and will not be further illustrated herein. The second period may be a scan period of scan lines $S_3$ and $S_4$ in the first frame period of the display panel 10 and operations of the source driving apparatus 200 are the same as in the above description on the second period and will not be further illustrated herein.

Figure 2D:
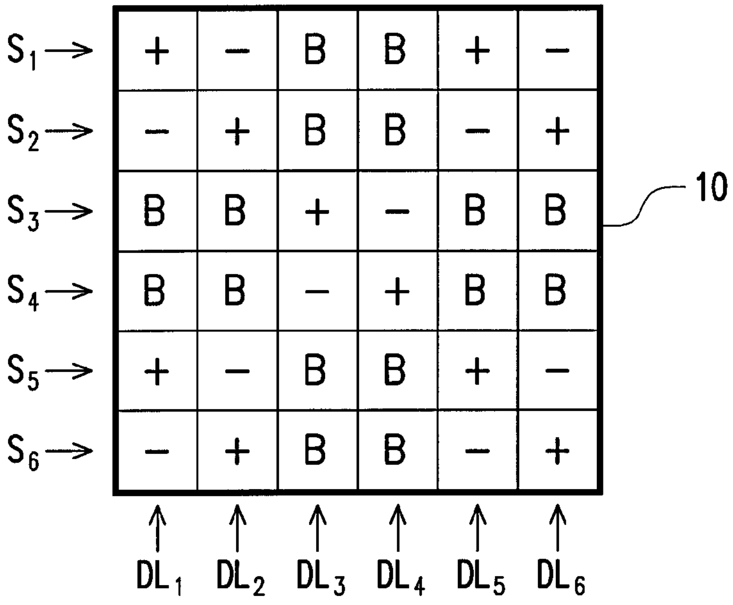

Next, in a scan period of scan lines $S_5$ (not shown) and $S_6$ (not shown) in the first frame period, operations of the source driving apparatus 200 are the same as in the scan period of the scan lines $S_1$ and $S_2$. In a scan period of scan lines $S_7$ (not shown) and $S_8$ (not shown) in the first frame period, operations of the source driving apparatus 200 are the same as in the scan period of the scan lines $S_3$ and $S_4$. Similar deductions may be made on the remaining scan lines in the first frame period. Refer to the display in FIG. 2D which shows part of the pixels of the display panel in FIG. 2A. From FIG. 2D, in the first frame period, the display panel 10 displays two columns of normal display in the scan period of the scan lines $S_1$ and $S_2$, then two columns of black insertion, and then two columns of normal display again. Then, in the scan period of the scan lines $S_3$ and $S_4$, the display panel 10 displays two columns of black insertion, then two columns of normal display, and then two columns of black insertion again. Afterwards, in the scan period of the scan lines $S_5$ and $S_6$, the display panel 10 displays two columns of normal display, then two columns of black insertion, and then two columns of normal display again. Similar deductions may be made on scan periods of the remaining scan lines in the first frame period based on the above description.

Figure 2E:
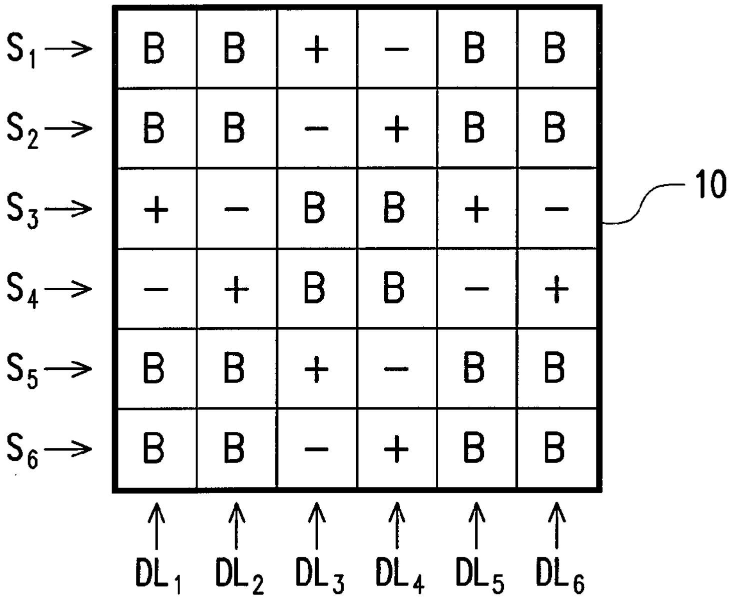

Subsequently, in the second frame period, the scan periods of the scan lines corresponding to the first period and the second period are the opposite of the scan periods in the first frame period. As a result, the pixels which display normal display in the first frame period display black insertion in the second frame period and the pixels which display black insertion in the first frame period display normal display in the second frame period. Refer to the display in FIG. 2E which shows part of the pixels of the display panel in FIG. 2A.

Operations of the source driving apparatus 200 in a third frame period are the same as the operations in the first frame period and operations of the source driving apparatus 200 in a fourth frame period are the same as the operations in the second frame period. Operations of the source driving apparatus 200 in remaining frame periods may be deduced from the above illustration and will not be further described at length herein.

Figure 2F:
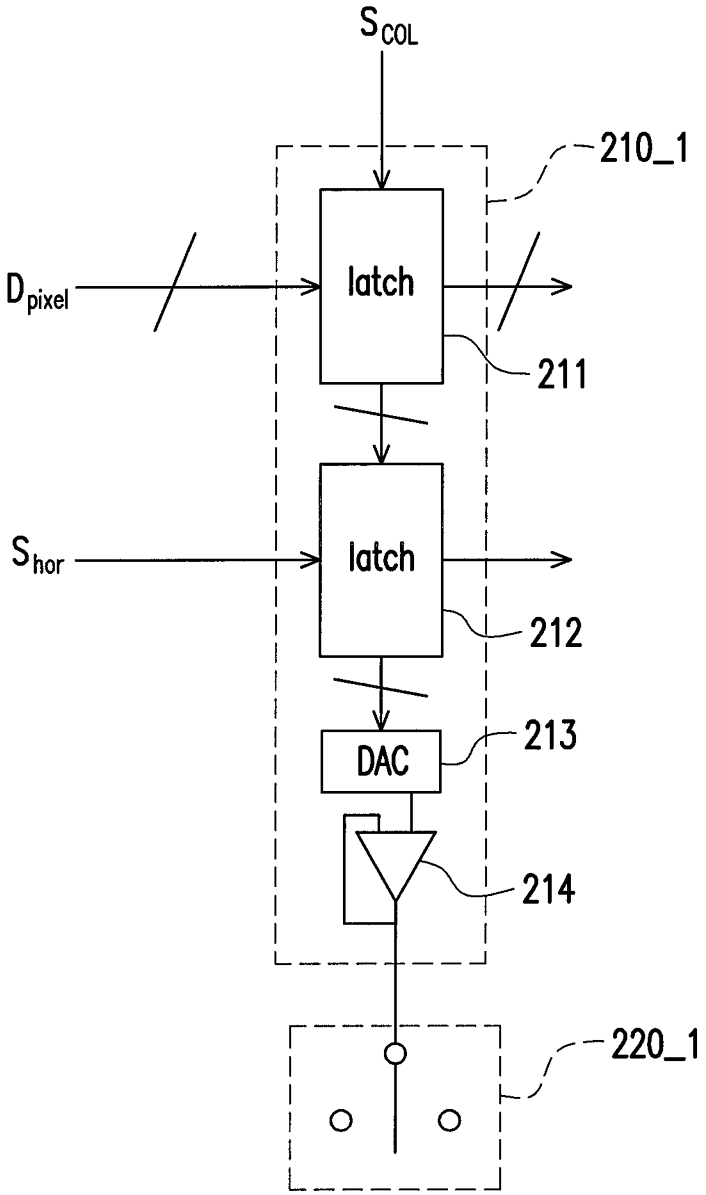
FIG. 2F is a block diagram illustrating a data channel 210_1 of FIG. 2A.

FIG. 2F is a block diagram illustrating a data channel 210_1 in FIG. 2A. Referring to FIG. 2F, in the present embodiment, the data channel 210_1 includes a first latch 211, a second latch 212, a digital to analog converter (DAC) 213, and an amplifier 214. An input terminal of the first latch 211 receives pixel data $D_{pixel}$ and a trigger terminal of the first latch 211 is coupled to a control signal $S_{COL}$. An input terminal of the second latch 212 is coupled to an output terminal of the first latch 211 and a trigger terminal of the second latch 212 is coupled to a horizontal synchronizing signal $S_{hor}$. An input terminal of the DAC 213 is coupled to an output terminal of the second latch 212. An input terminal of the amplifier 214 is coupled to an output terminal of the DAC 213 and an output terminal of the amplifier 214 is coupled to the first common terminal of the first selector 220_1.

The first latch 211 decides whether to output the pixel data $D_{pixel}$ to a next data channel (i.e. the data channel 210_2) and the second latch 212 according to the control signal $S_{COL}$. The second latch 212 decides whether to output the received pixel data $D_{pixel}$ to the DAC 213 according to the horizontal synchronization signal $S_{hor}$. The DAC 213 converts the received pixel data $D_{pixel}$ to an analog signal and transmits the analog signal to the first selector 220_1 through the amplifier 214. The data channels 210_2~210_m may be implemented in reference to the above description.

It should be noted that if the number n of data lines of the display panel 10 is not equal to 2m, the actual data lines are configured in sequence according to the number such that the second terminals and even the first terminals of the final first and second selectors (e.g. 220_m and 230_m) are left unconnected. Similarly, the source driving apparatus 200 may still perform black insertion on images of the display panel 10.

[Second Embodiment]

Figure 3A:
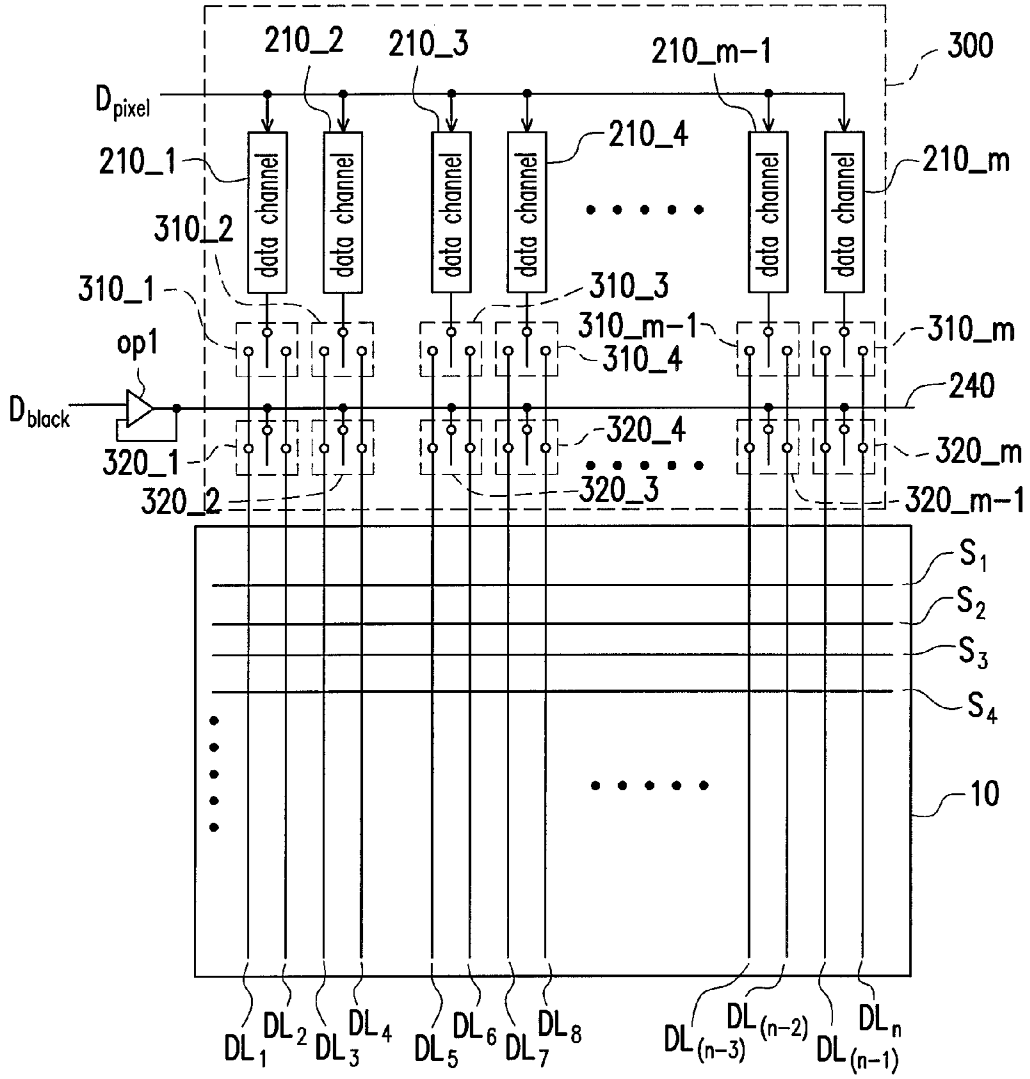
FIG. 3A is a schematic diagram of a source driving apparatus of a second embodiment of the present invention coupled to a display panel.

FIG. 3A is a schematic diagram of a source driving apparatus of the second embodiment of the present invention coupled to a display panel. Referring to FIG. 2A and FIG. 3A, the major difference lies in first selectors 310_1~310_m and the second selectors 320_1~320_m in a source driving apparatus 300, wherein elements similar to those in the embodiment of FIG. 2A are denoted with similar reference numerals. Take the first selector 310_1 in the first selectors 310_1~310_m as an example for illustration. A first terminal of the first selector 220_1 is coupled to the data line $DL_1$ (i.e. the first data line) in the display panel 10, a second terminal of the first selector 220_1 is coupled to the data line $DL_2$ (i.e. the second data line) in the display panel 10, and a first common terminal of the first selector 220_1 is coupled to an output terminal of the first data channel 210_1. Also take the second selector 320_1 in the second selectors 320_1~320_m as an example for illustration. A first terminal of the second selector 320_1 is coupled to the data line $DL_1$, a second terminal of the second selector 320_1 is coupled to the data line $DL_2$, and a common terminal of the second selector 320_1 is coupled to the black insertion data line 240. The above description may be regarded as a path of data transmission of the data channel 210_1.

In addition, path of data transmission of the data channel 210_2 is illustrated in the following. A first terminal of the first selector 310_2 is coupled to the data line $DL_3$ in the display panel 10, a second terminal of the first selector 310_2 is coupled to the data line $DL_4$ in the display panel 10, and a first common terminal of the first selector 310_2 is coupled to an output terminal of the data channel 210_2. A first terminal of the second selector 320_2 is coupled to the data line $DL_3$, a second terminal of the second selector 320_2 is coupled to the data line $DL_4$, and a common terminal of the second selector 320_2 is coupled to the black insertion data line 240. Paths of data transmission of the data channels 210_3~210_m may be deduced from the above description. The first terminals and the second terminals of the first and second selectors in the data transmission path of the data channel are respectively coupled to adjacent data lines. In addition, the first and second selectors in the data transmission paths of different data channels are coupled to two different and adjacent data lines. Accordingly, bandwidth of data transmission can be reduced.

Figure 3B:
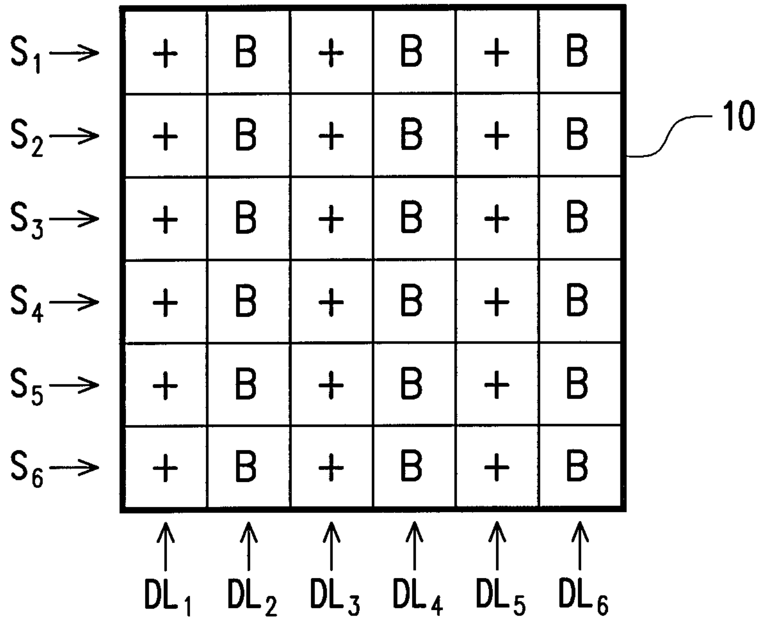
FIGS. 3B, 3C, 3D, and 3E are schematic diagrams showing part of pixels in the display panel of FIG. 3A.

In a first period (herein illustrated with a first frame period as an example), the first selectors 310_1~310_m all electrically connect the first common terminals thereof to the first terminals thereof and the second selectors 320_1~320_m all electrically connect the common terminals thereof to the second terminals thereof. In other words, the data lines $DL_1$, $DL_3$, $DL_5$, $DL_7$ . . . , $DL_{(n-3)}$, and $DL_{(n-1)}$ receive the pixel data which enables the pixels of these data lines to display normal display. The remaining data lines $DL_2$, $DL_4$, $DL_6$, $DL_8$ . . . , $DL_{(n-2)}$, and $DL_n$ receive the black insertion data $D_{black}$ which enables the pixels of these data lines to display black insertion. Refer to the display in FIG. 3B which shows part of the pixels of the display panel of FIG. 3A. From FIG. 3B, the display panel 10 displays one column of normal display, then one column of black insertion, then one column of normal display, then one column of black insertion, and so forth.

Figure 3C:
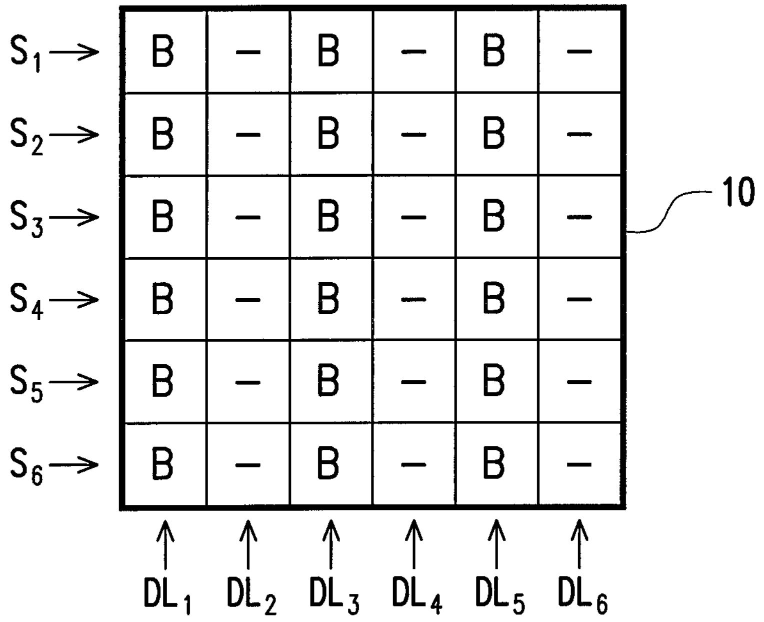

In a second period (herein illustrated with a second frame period as an example), the first selectors 310_1~310_m all electrically connect the first common terminals thereof to the second terminals thereof and the second selectors 320_1~320_m all electrically connect the common terminals thereof to the first terminals thereof. In other words, the data lines $DL_1$, $DL_3$, $DL_5$, $DL_7$ . . . , $DL_{(n-3)}$, and $DL_{(n-1)}$ receive the black insertion data $D_{black}$ which enables the pixels of these data lines to display black insertion. The remaining data lines $DL_2$, $DL_4$, $DL_6$, $DL_8$ . . . , $DL_{(n-2)}$, and $DL_n$ receive the pixel data which enables the pixels of these data lines to display normal display. Refer to the display in FIG. 3C which shows part of the pixels of the display panel in FIG. 3A. From FIG. 3C, the display panel 10 displays one column of black insertion, then one column of normal display, then one column of black insertion, then one column of normal display, and so forth.

Operations of the source driving apparatus 200 in a third frame period are the same as the operations in the first frame period and operations of the source driving apparatus 200 in a fourth frame period are the same as the operations in the second frame period. Operations of the source driving apparatus 200 in remaining frame periods may be deduced from the above illustration and will not be further described at length herein. Accordingly, black insertion of a display panel may be performed with column black insertion in order to enhance display quality of a dynamic image.

Figure 3D:
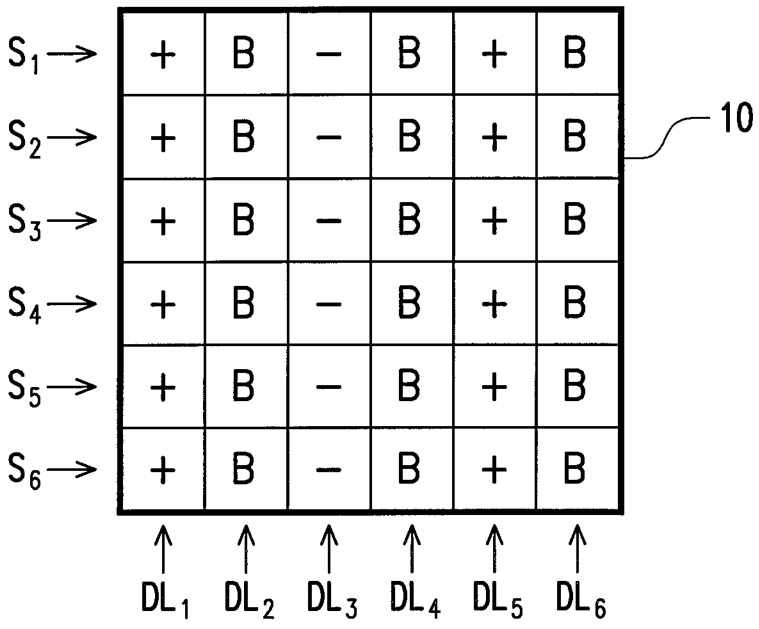
Figure 3E:
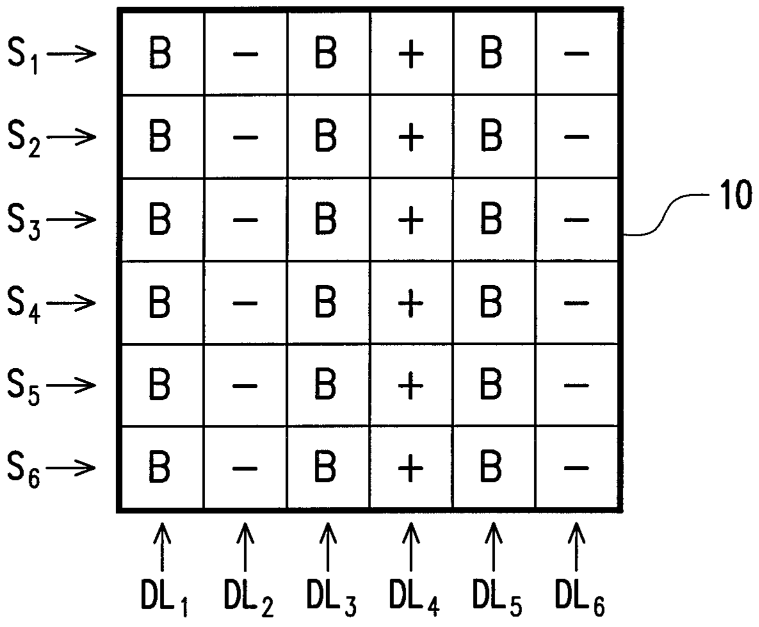

Furthermore, due to the difference in the polarity of the pixel data, the display of the above embodiment may also be as shown in FIG. 3D and FIG. 3E which show part of the pixels of the display panel of FIG. 3A. It should be noted that if the number n of data lines of the display panel 10 is not equal to 2m, the actual data lines are configured in sequence according to the number such that the second terminal and even the first terminal of the final first and second selectors (e.g. 310_m and 320_m) are left unconnected. Similarly, the source driving apparatus 300 may still perform black insertion on images of the display panel 10.

[Third Embodiment]

Figure 4A:
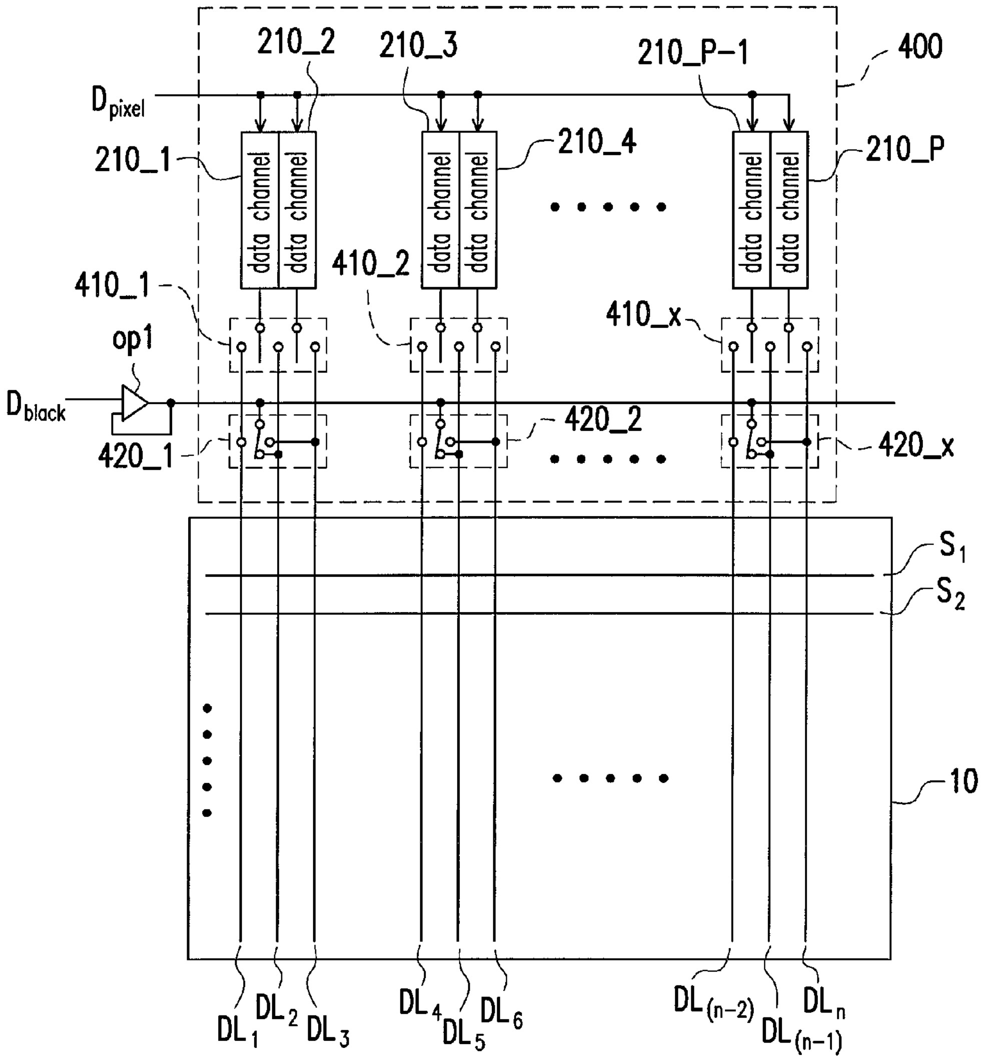
FIG. 4A is a schematic diagram of a source driving apparatus of a third embodiment of the present invention coupled to a display panel.

FIG. 4A is a schematic diagram of a source driving apparatus of the third embodiment of the present invention coupled to a display panel. Referring to FIG. 2A and FIG. 4A, elements of same functions as those in the embodiment of FIG. 2A are denoted with same reference numerals. In the present embodiment, a source driving apparatus 400 includes data channels 210_1~210_P, a black insertion data line 240, first selectors 410_1~410_x, and second selectors 420_1~420_x, wherein P, x, and n are all positive integers, n is presumed to be 3x, and P is presumed to be 2x. The black insertion data line is for providing black insertion data $D_{black}$ and the data channels 210_1~210_P jointly receive pixel data $D_{pixel}$.

Take the first selector 410_1 in the first selectors 410_1~410_x as an example for illustration. A first terminal of the first selector 410_1 is coupled to a data line $DL_1$ in a display panel 10, a second terminal of the first selector 410_1 is coupled to a data line $DL_2$ in the display panel 10, a third terminal of the first selector 410_1 is coupled to a data line $DL_3$ in the display panel 10, a first common terminal of the first selector 410_1 is coupled to an output terminal of the data channel 210_1 (i.e. the first data channel), and a second common terminal of the first selector 410_1 is coupled to an output terminal of the data channel 210_2 (i.e. the second data channel). A first terminal of the first selector 410_2 is coupled to a data line $DL_4$ in a display panel 10, a second terminal of the first selector 410_2 is coupled to a data line $DL_5$ in the display panel 10, a third terminal of the first selector 410_2 is coupled to a data line $DL_6$ in the display panel 10, a first common terminal of the first selector 410_2 is coupled to an output terminal of the data channel 210_3, and a second common terminal of the first selector 410_2 is coupled to an output terminal of the data channel 210_4. Similar deduction for the first selectors 410_3~410_x may be made from the above description. Also take the second selector 420_1 in the second selectors 420_1~420_x as an example for illustration. A first terminal of the second selector 420_1 is coupled to the data line $DL_1$, a second terminal of the second selector 420_1 is coupled to the data line $DL_2$, a third terminal of the second selector 420_1 is coupled to the data line $DL_3$, and a common terminal of the second selector 420_1 is coupled to the black insertion data line 240. A first terminal of the second selector 420_2 is coupled to the data line $DL_4$, a second terminal of the second selector 420_2 is coupled to the data line $DL_5$, a third terminal of the second selector 420_2 is coupled to the data line $DL_6$, and a common terminal of the second selector 420_2 is coupled to the black insertion data line 240. Similar deduction for the second selectors 420_3~420_x may be made from the above description. Accordingly, bandwidth of data transmission can be reduced by ⅓. In a first frame period (i.e. a second period), the first selectors 410_1~410_x all electrically connect the first common terminals thereof to the second terminals thereof, the first selectors 410_1~410_x all electrically connect the second common terminals thereof to the third terminals thereof, and the second selectors 420_1~420_x all electrically connect the common terminals thereof to the first terminals thereof. In other words, the data lines $DL_2$, $DL_3$, $DL_5$, $DL_6$ . . . , $DL_{(n-1)}$, and $DL_n$ receive the pixel data which enables the pixels of these data lines to display normal display. The remaining data lines $DL_1$, $DL_4$, $DL_7$(not shown) . . . , and $DL_{(n-2)}$ receive the black insertion data $D_{black}$ which enables the pixels of these data lines to display black insertion. Refer to the display in FIG. 4B which shows part of the pixels of the display panel in FIG. 4A. From FIG. 4B, the display panel 10 displays one column of black insertion, then two columns of normal display, then one column of black insertion, then two columns of normal display, and so forth.

In a second frame period (i.e. a first period), the first selectors 410_1~410_x all electrically connect the first common terminals thereof to the first terminals thereof, the first selectors 410_1~410_x all electrically connect the second common terminals thereof to the third terminals thereof, and the second selectors 420_1~420_x all electrically connect the common terminals thereof to the second terminals thereof. In other words, the data lines $DL_1$, $DL_3$, $DL_4$, $DL_6$ . . . , $DL_{(n-2)}$, and $DL_n$ receive the pixel data which enables the pixels of these data lines to display normal display. The remaining data lines $DL_2$, $DL_5$, $DL_8$(not shown) . . . , and $DL_{(n-1)}$ receive the black insertion data $D_{black}$ which enables the pixels of these data lines to display black insertion. Refer to the display in FIG. 4C which shows part of the pixels of the display panel in FIG. 4A. From FIG. 4C, the display panel 10 displays one column of normal display, then one column of black insertion, then two columns of normal display, then one column of black insertion, then one column of normal display, and so forth.

In a third frame period (i.e. a third period), the first selectors 410_1~410_x all electrically connect the first common terminals thereof to the first terminals thereof, the first selectors 410_1~410_x all electrically connect the second common terminals thereof to the second terminals thereof, and the second selectors 420_1~420_x all electrically connect the common terminals thereof to the third terminals thereof. In other words, the data lines $DL_1$, $DL_2$, $DL_4$, $DL_5$ . . . , $DL_{(n-2)}$, and $DL_{(n-1)}$ receive the pixel data which enables the pixels of these data lines to display normal display. The remaining data lines $DL_3$, $DL_6$, $DL_9$(not shown) . . . , and $DL_n$ receive the black insertion data $D_{black}$ which enables the pixels of these data lines to display black insertion. Refer to the display in FIG. 4D which shows part of the pixels of the display panel in FIG. 4A. From FIG. 4D, the display panel 10 displays two columns of normal display, then one column of black insertion, then two columns of normal display, then one column of black insertion again, and so forth.

Operations of the source driving apparatus 400 in a fourth frame period are the same as the operations in the first frame period. Operations of the source driving apparatus 400 in a fifth frame period are the same as the operations in the second frame period. Operations of the source driving apparatus 400 in a sixth frame period are the same as the operations in the third frame period. Operations of the source driving apparatus 400 in remaining frame periods may be deduced from the above illustration and will not be further described at length herein.

It should be noted that if the number n of data lines of the display panel 10 is not equal to 3x, the actual data lines are configured in sequence according to the number such that the third terminals, the second terminals and even the first terminals of the final first and second selectors (e.g. 410_x and 420_x) are left unconnected. Similarly, the source driving apparatus 400 may still perform black insertion on images of the display panel 10.

Figure 5:
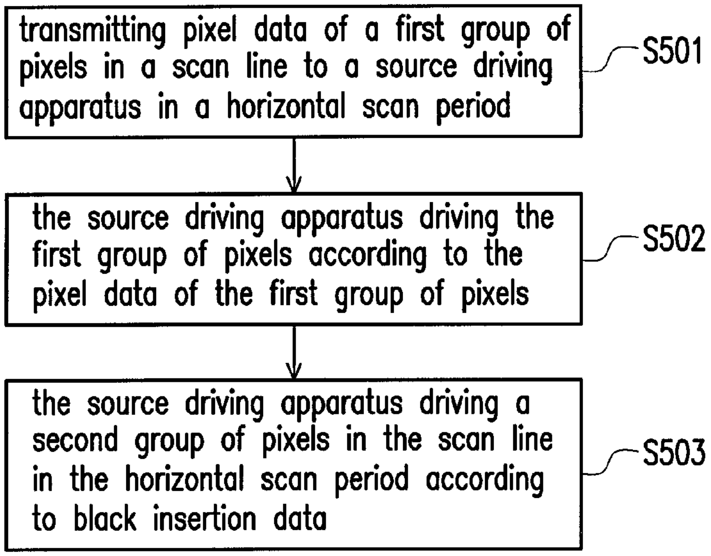
FIG. 5 is a flowchart illustrating a method of black insertion according to an embodiment of the present invention.

Furthermore, the above embodiments may be integrated as a method of black insertion. FIG. 5 is a flowchart illustrating the method of black insertion according to an embodiment of the present invention. Referring to FIG. 5, the method of black insertion includes the following steps. First, in step S501, pixel data of a first group of pixels in a scan line is transmitted to a source driving apparatus in a horizontal scan period. Next, in step S502, the source driving apparatus drives the first group of pixels according to the pixel data of the first group of pixels. In step S503, the source driving apparatus drives a second group of pixels in the scan line in the horizontal scan period according to black insertion data, wherein the second group of pixels is different from the first group of pixels. It should be noted that the above steps S502 and S503 may be simultaneously performed. In other words, pixel data and black insertion data may both be written into pixel rows corresponding to a scan line at the same time in a same horizontal scan period.

According to the above-mentioned method, if the pixels of the first group are adjacent to each other and the pixels of the second group are also adjacent to each other, a display image of the display panel is as shown in FIGS. 2B~2E. If the pixels of the first group are not adjacent to each other and the pixels of the second group are also not adjacent to each other, a display image of the display panel is as shown in FIGS. 3B~3E. In addition, in some embodiments, step S502 may be performed before step S503. In other embodiments, step S503 may be performed before step S502. Alternatively as the above, step S502 and step S503 may be performed at the same time.

Figure 6:
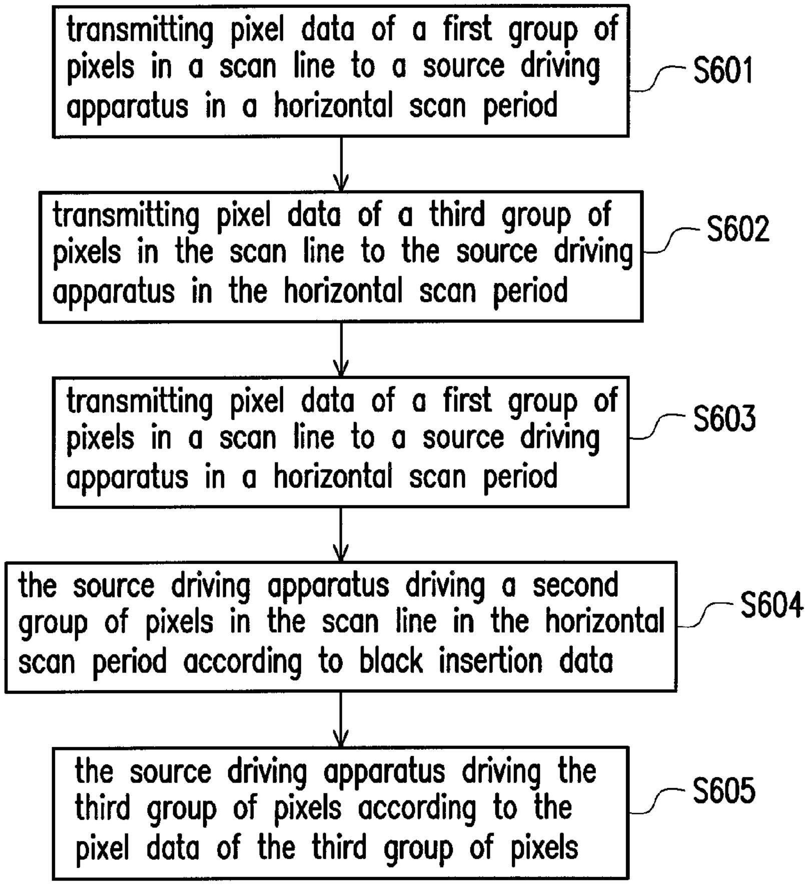
FIG. 6 is a flowchart illustrating a method of black insertion according to another embodiment of the present invention.

FIG. 6 is a flowchart illustrating a method of black insertion according to another embodiment of the present invention. Referring to FIG. 6, the method of black insertion includes the following steps. First, in step S601, pixel data of a first group of pixels in a scan line is transmitted to a source driving apparatus in a horizontal scan period. In step S602, pixel data of a third group of pixels in the scan line is transmitted to the source driving apparatus in the horizontal scan period. In step S603, the source driving apparatus drives the first group of pixels according to the pixel data of the first group of pixels. In step S604, the source driving apparatus drives a second group of pixels in the scan line in the horizontal scan period according to black insertion data, wherein the second group of pixels is different from the first group of pixels. In step S605, the source driving apparatus drives the third group of pixels according to the pixel data of the third group of pixels, wherein the third group of pixels is different from the second group of pixels. It should be noted that the above steps S603, S604, and S605 may be simultaneously performed. In other words, pixel data and black insertion data may both be written into pixel rows corresponding to a scan line at the same time in a same horizontal scan period.

Figure 4B:
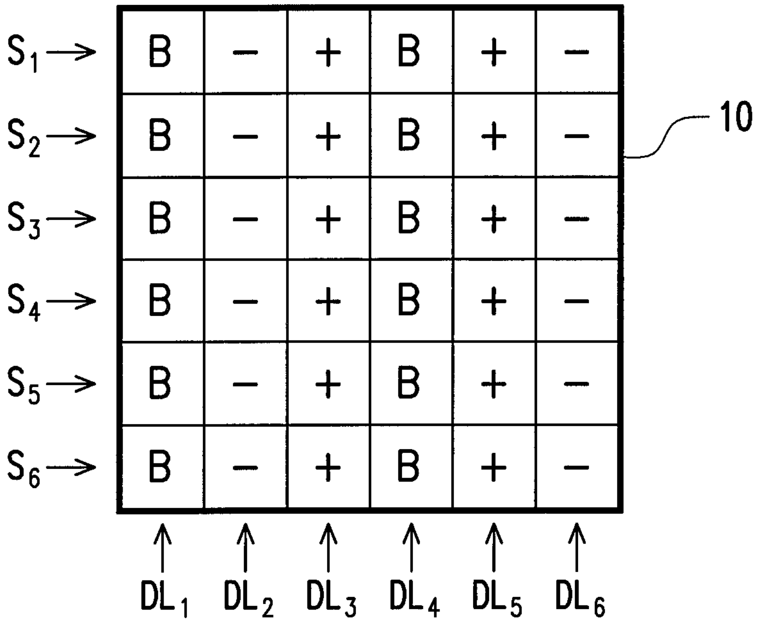
FIGS. 4B, 4C, and 4D are schematic diagrams showing part of pixels in the display panel of FIG. 4A.
Figure 4C:
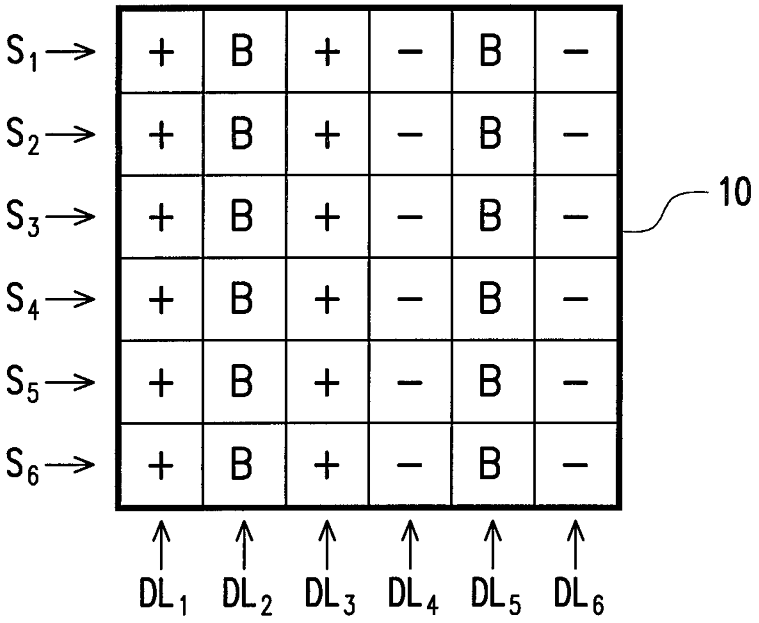
Figure 4D:
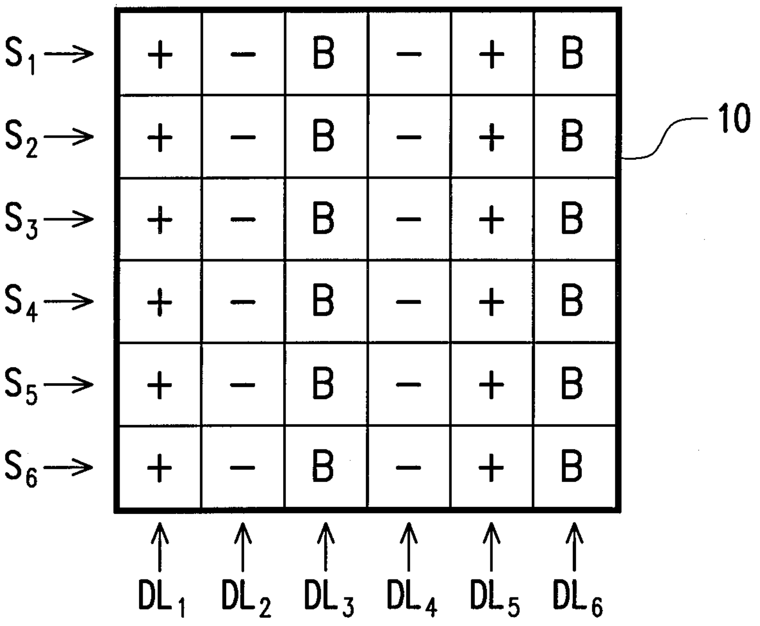

According to the above method, if the pixels of the first group are not adjacent to each other, the pixels of the second group are not adjacent to each other, and the pixels of the third group are also not adjacent to each other, a display image of the display panel is as shown in FIGS. 4B~4D. In addition, in some embodiments, step S603 may be performed before steps S604 and S605. In other embodiments, step S605 may be performed before step S603.

In summary, in the source driving apparatus and the method of black insertion of the present invention, the pixel data required to be displayed in the scan line is transmitted and the rest of the pixels are driven with the black insertion data so that the pixel data and the black insertion data are simultaneously displayed on at least a single scan line. Accordingly, column black insertion is used for performing black insertion to enhance dynamic display of an image and to reduce bandwidth of data transmission.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A source driving apparatus, comprising:

a first data channel, for providing display data;

a second data channel;

a black insertion data line, for providing black insertion data;

a first selector, having a first terminal coupled to a first data line in a display panel, a second terminal coupled to a second data line in the display panel, a third terminal coupled to a third data line in the display panel, a first common terminal of the first selector coupled to the first data channel, and a second common terminal coupled to an output terminal of the second data channel, wherein the first selector electrically connects the first common terminal thereof to the first terminal thereof and electrically connects the second common terminal thereof to the third terminal thereof in a first period, the first selector electrically connects the first common terminal thereof to the second terminal thereof and electrically connects the second common terminal thereof to the third terminal thereof in a second period, and the first selector electrically connects the first common terminal thereof to the first terminal thereof and electrically connects the second common terminal thereof to the second terminal thereof in a third period; and a second selector, having a first terminal coupled to the first data line, a second terminal of the second selector coupled to the second data line, and a common terminal of the second selector coupled to the black insertion data line, wherein the second selector electrically connects the common terminal thereof to the second terminal thereof in the first period, and the second selector electrically connects the common terminal thereof to the first terminal thereof in the second period.

2. The source driving apparatus according to claim 1, wherein the second selector further comprises a third terminal connected to the third data line, and the second selector electrically connects the common terminal thereof to the third terminal thereof in the third period.

3. The source driving apparatus according to claim 2, wherein the first period is a (3i-1)th frame period of the display panel, and i is a positive integer.

4. The source driving apparatus according to claim 3, wherein the second period is a (3i-2)th frame period of the display panel.

5. The source driving apparatus according to claim 4, wherein the third period is a 3ith frame period of the display panel.

6. A display system, comprising: a display panel; and a source driving circuit, coupled to the display panel for simultaneously outputting black insertion data and pixel data to the display panel so that the display panel displays the pixel data and the black insertion data at the same time on at least one scan line, the source driving apparatus comprising: a first data channel, for providing the pixel data;

a second data channel;

a black insertion data line for providing black insertion data;

a first selector, having a first terminal coupled to a first data line in the display panel, a second terminal coupled to a second data line in the display panel a third terminal coupled to a third data line in the display panel, a first common terminal of the first selector coupled to the first data channel, and a second common terminal coupled to an output terminal of the second data channel, wherein the first selector electrically connects the first common terminal thereof to the first terminal thereof and electrically connects the second common terminal thereof to the third terminal thereof in a first period, the first selector electrically connects the first common terminal thereof to the second terminal thereof and electrically connects the second common terminal thereof to the third terminal thereof in a second period, and the first selector electrically connects the first common terminal thereof to the first terminal thereof and electrically connects the second common terminal thereof to the second terminal thereof in a third period; and a second selector, having a first terminal coupled to the first data line, a second terminal of the second selector coupled to the second data line, and a common terminal of the second selector coupled to the black insertion data line, wherein the second selector electrically connects the common terminal thereof to the second terminal thereof in the first period, and the second selector electrically connects the common terminal thereof to the first terminal thereof in the second period.

7. The display system according to claim 6, wherein the source driving circuit outputs the pixel data to drive a first group of pixels on the scan line and outputs the black insertion data to drive a second group of pixels on the scan line so that the first group of pixels and the second group of pixels respectively display the pixel data and the black insertion data.

8. The display system according to claim 7, wherein the first group of pixels and the second group of pixels are different from each other.

9. The display system according to claim 8, wherein pixels of the first group of pixels are not adjacent to each other.

10. The display system according to claim 8, wherein pixels of the second group of pixels are not adjacent to each other.

* * * * *